United States Patent [19]

Tomita et al.

[11] Patent Number: 4,740,290

[45] Date of Patent: Apr. 26, 1988

[54] PROCESS FOR THERMAL CRACKING OF HEAVY OIL

[75] Inventors: Tadayoshi Tomita, Yokohama; Katsutoshi Kikuchi; Takayuki Sakamoto, both of Chiba; Toshihiro Ishida; Atsushi Moriya, both of Mobara, all of Japan

[73] Assignee: Toyo Engineering Corporation, Tokyo, Japan

[21] Appl. No.: 33,922

[22] Filed: Apr. 1, 1987

Related U.S. Application Data

[63] Continuation of Ser. No. 522,889, Aug. 12, 1983, abandoned.

[30] Foreign Application Priority Data

Aug. 13, 1982 [JP] Japan .............................. 57-140595

[51] Int. Cl.$^4$ .............................................. C10G 57/00
[52] U.S. Cl. ........................................ 208/67; 208/49; 208/106; 208/130; 208/132; 423/651; 423/652; 422/197
[58] Field of Search .................. 208/67, 69, 70, 49, 208/106, 130, 132, 461, 491, 48 R; 423/651, 652, 653; 48/197 R; 422/197

[56] References Cited

U.S. PATENT DOCUMENTS

| 2,772,955 | 12/1956 | Fauser ............................... 423/651 |
| 3,097,935 | 7/1963 | Steinhofer et al. .................... 208/67 |
| 3,145,238 | 8/1964 | Kestner ............................... 208/67 |
| 3,306,844 | 2/1967 | Brierley et al. ...................... 208/132 |
| 3,479,298 | 11/1969 | Sze et al. ............................ 423/651 |
| 3,579,438 | 5/1971 | Cruse ................................. 208/132 |
| 3,579,601 | 5/1971 | Kivlen ................................ 208/132 |
| 3,711,568 | 1/1973 | Cooper ............................... 208/132 |
| 4,065,379 | 12/1977 | Soonawala et al. ................... 208/67 |
| 4,214,979 | 7/1980 | Nakanishi et al. .................. 208/48 R |
| 4,242,196 | 12/1980 | Alba et al. .......................... 208/132 |
| 4,321,130 | 3/1982 | Bacsik ............................... 208/106 |

FOREIGN PATENT DOCUMENTS

| 2014604 | 8/1979 | United Kingdom ............... 208/130 |
| 2125430 | 3/1984 | United Kingdom ............... 208/132 |

Primary Examiner—Helen M. S. Sneed
Assistant Examiner—Anthony McFarlane
Attorney, Agent, or Firm—Flynn, Thiel, Boutell & Tanis

[57] ABSTRACT

A process is disclosed for the thermal cracking of heavy oil containing nonvaporizable, high-molecular weight hydrocarbone in the presence of steam in one or more thermal cracking tubes or ducts, which process is characterized in that a fluid comprising steam and heavy oil is flowed through a thermal cracking tube such that thermal cracking is carried out under the following conditions:

(a) temperature of the fluid in the thermal cracking tube: 800° to 1100° C.
(b) pressure of the fluid in the thermal cracking tube: 0 to 50 kg/cm$^2$G
(c) flow rate or velocity of fluid through the thermal cracking tube: 10 to 100 m/sec, and
(d) residence time of the fluid in the thermal cracking tube: at least 0.2 seconds.

20 Claims, 4 Drawing Sheets

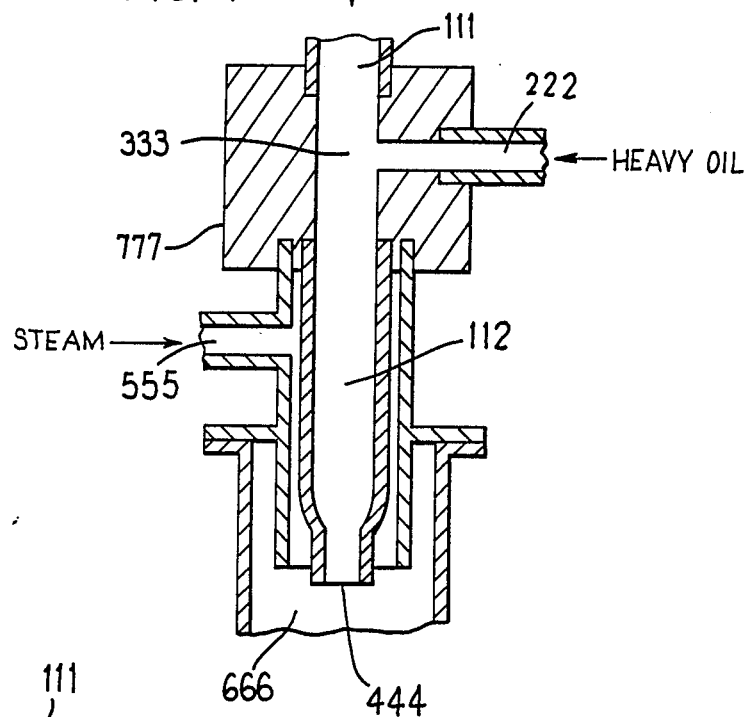
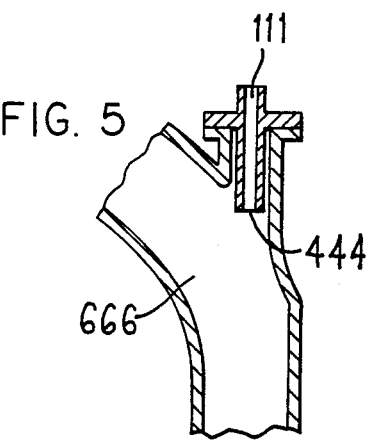

PROCESS FOR THERMAL CRACKING OF HEAVY OIL

This application is a continuation of application Ser. No. 522,889, filed Aug. 12, 1983, now abandoned.

The present invention relates to a process for thermal cracking of heavy oil.

Heavy oils contain heavy hydrocarbons of high molecular weight which are fluid at ambient or slightly elevated temperatures, but they cannot be vaporized by heating. Examples of such heavy oils include atmospheric distillation residue, vacuum distillation residue, tar, pitch, crude oil such as heavy crude oil occurring in Canada, Venezuela and China, and heavy crude oil obtained from tar sands and oil shale. These heavy oils can be thermally cracked in the presence of steam for use in various applications. However, during the thermal cracking of heavy oil, carbon is deposited and tar-like substances accumulate in thermal cracking tubes or ducts, the tubes of subsequent reaction zones and various reactors. Many of these heavy oils contain not only hydrocarbons, but also impurities, such as oxygen-containing compounds, nitrogen-containing compounds, sulfur-containing compounds and inorganic ingredients. Thus, when a reforming reaction employing a catalyst is conducted in a subsequent reaction stage after thermal cracking, the catalyst is liable to be poisoned and the reforming reaction of this type cannot be carried out.

A process for the thermal cracking of heavy oil in the presence of steam is disclosed, for example, in the specification of Japanese Patent Laid-Open No. 101804/1979, which describes a process for the production of a synthetic gas, which process comprises thermally cracking heavy oil in the presence of steam in a tube containing no packing, and then subjecting the thermally cracked product to catalytic steam reforming in a reactor packed with a reforming catalyst. Thermal cracking is an endothermic reaction and is conducted by external heating of hydrocarbons in a space free of packing material. However, since the conditions under which the heat transfer efficiency in such a thermal cracking zone is maximized and a good operation can be carried out are unknown, we have studied these conditions and thereby accomplished the present invention.

BRIEF DESCRIPTION OF THE DRAWINGS

FIG. 4 is a vertical sectional view of a feeder used in the present invention.

FIG. 5 is a vertical sectional view showing the mounting of a heavy oil feeder (upper portion omitted) to a thermal cracking tube near a bend in the tube.

Figure 1A:
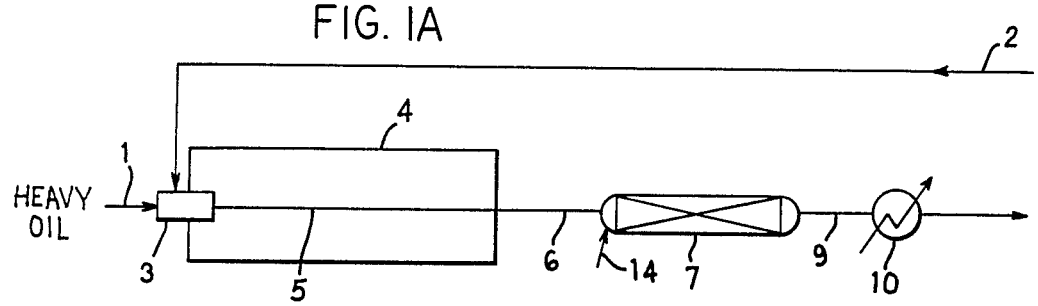
FIGS. 1A, 1B, 2 and 3 are schematic representations of apparatus used to carry out four embodiments of the process of the present invention.

The present invention provides a process for the thermal cracking of heavy oil containing nonvaporizable, high-molecular weight hydrocarbons, in the presence of steam, in one or more thermal cracking tubes or ducts, in which a fluid comprising steam and heavy oil is flowed through a thermal cracking tube such that thermal cracking is carried out under the following conditions:

(a) temperature of the fluid in the thermal cracking tube: 800° to 1100° C.

(b) pressure of the fluid in the thermal cracking tube: 0 to 50 kg/cm$^2$G (c) flow rate or velocity of fluid flow through the thermal cracking tube: 10 to 100 m/sec, and (d) residence time of the fluid in the thermal cracking tube: at least 0.2 seconds The thermal cracking reaction of the present invention is conducted at a temperature in the range of 800° to 1100° C., under a pressure of 0 to 50 kg/cm$^2$G (gauge), preferably at a temperature of 850° to 1050° C. under a pressure of 5 to 40 kg/cm$^2$G, particularly at a temperature of 900° to 1025° C. under a pressure of 10 to 40 kg/cm$^2$G. When the temperature and pressure of the fluid reaction mixture do not lie within the ranges specified above, the reaction proceeds unsatisfactorily or expensive equipment is required.

The flow rate or velocity of the fluid stream that flows through the thermal cracking tube in the present invention means the speed of movement of the fluid stream comprising steam and other gases at the site where the starting heavy oil is fed into the thermal cracking tube or duct. The flow rate can be calculated from the cross-sectional area of the tube, the amount of gas to be fed in, and the reaction temperature and pressure. The flow rate employed in the process of the present invention is in the range of 10 to 100 m/sec, preferably 25 to 90 m/sec, particularly 50 to 90 m/sec. By adjusting the flow rate within the range specified above, the efficiency of the process can be improved. When the flow rate is less than 10 m/sec, the efficiency becomes poor, whereas when it exceeds 100 m/sec, the pressure loss is excessively increased which is disadvantageous.

The residence time of the heavy oil in the thermal cracking tube is a period of time long enough so that the heavy oil is thermally cracked to the desired extent. The residence time is 0.2 sec or longer, preferably 0.4 sec or longer, in the process according to the invention. When the residence time is shorter than 0.2 sec, the thermal cracking of the heavy oil is likely to be insufficient, resulting in problems such as, for example, a catalytic steam reforming zone provided downstream of the thermal cracking zone and the conduits therefor become contaminated. Thus, a residence time of less than 0.2 sec is not satisfactory. Generally, the residence time is not greater than 4 seconds, and preferably is 2 seconds or less. Although a residence time exceeding 4 seconds does not cause an adverse effect on the reaction, it requires extra equipment and heating not in proportion to the poor degree of progress of the cracking reaction, and increases the pressure loss. Thus, a residence time longer than 4 seconds should not be used unless there is some special reason therefor, for example, if it is necessary to use equipment that was not originally designed for performing the present invention.

The fluid flow rate used in the process of the present invention is considerably higher than the flow rates employed in conventional thermal cracking processes. For example, the calculated maximum flow rate was 3.7 m/sec in the examples of the specification of the above-mentioned Japanese Patent Laid-Open No. 101804/1979, although the flow rate was not specified therein. Since the flow rate in the thermal cracking zone of the present invention is considerably higher as compared with those employed in conventional thermal cracking processes, the diameter of the thermal cracking tube or pipe can be made smaller than is possible for the conventional processes, thereby improving the heat transfer efficiency of the process of the invention. Futher, the reduction of the wall thickness of the cracking tube and the increase in the ratio of the inner surface area to the internal volume of the thermal cracking tube, which result from such decreased tube diameter, also increase the heat transfer efficiency. Thus, in the process of the invention, a particularly long residence time is not required as compared with conventional processes. Moreover, since the temperature difference between the inner and outer surfaces of a thin-walled tube is small, the temperature of the outer wall surface can be lowered while still providing a sufficiently high inner wall surface temperature, and therefore it becomes possible to use a lesser amount of an inexpensive material having less resistance to heat to make the thermal cracking tube, in comparison with the materials conventionally used to construct the thermal cracking tube.

The tube for thermally cracking heavy oil in the presence of steam, in the process of the present invention, has a tubular interior flow passage which does not contain a catalyst or any other solid packing material and is hollow and unfilled. If the diameter of the tube is reduced, the cross-sectional area of the flow passage becomes smaller and the above-mentioned effects can be obtained. In the present invention, the above effects are enhanced by providing a thermal cracking apparatus comprising a plurality of thermal cracking tubes connected in parallel flow relationship. The use of such parallel tubes provides a process in which the effects of the present invention can be economically obtained on a large scale, in comparison with a process in which the throughput capacity of the apparatus is increased by increasing the diameter of a single thermal cracking tube.

Generally, the product stream obtained from each thermal cracking tube is fed to a single conduit or reactor, such as a catalytic steam reforming reactor, i.e., a reforming zone. Each product stream can be fed directly to the reforming zone or can be fed through an independent conduit, which is provided for each thermal cracking tube, into a downstream reforming reactor or the like. When a plurality of thermal cracking tubes are used in parallel, it is preferred that the product streams from the thermal cracking tubes be merged through appropriate conduits into one conduit or as few conduits as possible, and then fed into the reforming reactor, whereby to obtain the resulting advantages of simplicity of the equipment, smaller temperature drop due to pressure loss and ease of maintenance.

The thermal cracking tubes are usually positioned in a heating chamber, such as a radiation furnace. Since the degree of heat absorption is often not uniform along the length of each tube from the upstream end to the downstream end of each tube, the equipment can be arranged to make the internal temperature of the fluid in the tubes as uniform as possible along the direction of flow by controlling the heat supplied to the tubes according to the degree of heat absorption by the tubes at different positions in the furnace.

An appropriate number of thermal cracking tubes are provided according to the flow capacity of the equipment used to conduct the process of the present invention, the desired flow rate, the residence time, the diameter of the tubes and other design parameters. The internal diameter of the tubes is generally from 25 to 250 mm, preferably from 30 to 200 mm, particularly from 50 to 150 mm. When the internal diameter is smaller than 25 mm, the heat transfer efficiency is improved, but the pressure drop along the length of the tube is increased. On a practical basis, it is necessary to increase the number of tubes and the design and maintenance of the equipment become complicated. Thus, a tube diameter of less than 25 mm is not preferred, although such can be used for experimental purposes in a laboratory or pilot plant. When the tube diameter is larger than 250 mm, the number of tubes can be reduced, but the stability of the high heat flux density zones becomes difficult to maintain and the heat transfer efficiency is lowered. In addition, it is necessary to raise the external heating temperature according to the increase of the tube wall thickness. Hence, the energy used by the heating furnace is remarkably increased and the tubes must be made of an expensive material having higher heat resistance. Thus, such a large tube diameter is not preferred.

The thermal cracking tubes need not always be placed in one heating chamber or furnace, but rather, they can be heated separately in different heating chambers individually or in groups. When a radiation furnace is used, one or more furnaces are usually used by providing each thermal cracking furnance with from one to several thermal cracking tubes. The use of a plurality of heating chambers or a partitioned chamber which enables each section to be independently operated and/or controlled is preferred for occasions when a process line is being operated under reduced load or is being started up.

In a conventional process for thermal cracking of heavy oil, such as the one disclosed in the above-mentioned Japanese Patent Laid-Open No. 101804/1979, heavy oil is fed into the thermal cracking tube by an atomizer having a complicated structure and requiring delicate adjustment. This is required because when the heavy oil is not positively atomized by using such a device, carbon is deposited as soon as the oil is fed into a high-temperature thermal cracking zone, which carbon deposit clogs the tube and makes continuation of the operation impossible.

It has been found, surprisingly in view of the prior art, that according to the process of the present invention, it is possible to maintain good operation of the process line, without the necessity of atomizing the heavy oil at the intake of the thermal cracking tube as required in the conventional process. As stated above, we have accomplished the present invention mainly by adjusting the conditions for stable operation and heat transfer efficiency. However, we have found that when heavy oil is injected into the thermal cracking zone or flow passage at an injection flow rate or velocity equal to or higher than the flow rate of the fluid in the tube, concurrently and in the same direction with the fluid, the process can be satisfactorily carried out without feeding the heavy oil into the fluid flow passage by means of an atomizer having a complicated structure which requires delicate adjustment.

Basically, the heavy oil can be pressure-fed into an inlet or intake opening of an oil feed pipe or tubular duct which communicates with the thermal cracking tube and the heavy oil can be injected from an outlet opening of the oil feed pipe into the thermal cracking tube concurrently with and in substantially the same direction as the flow of a fluid, such as steam, in the thermal cracking tube, at a flow velocity equal to or higher than the flow velocity of the fluid in the thermal cracking tube. Alternatively, the heavy oil can be injected from the oil feed pipe outlet into the thermal cracking tube in substantially the same direction as the direction of the flow of the fluid in the thermal cracking tube and substantially at the center of the cross section of the fluid passage of the thermal cracking tube at a flow rate not necessarily equal to or higher than the flow rate of the fluid in the thermal cracking tube. In this case, it is not necessary to use a feeder having a complicated structure and requiring delicate adjustment. Although it is not clear why atomization of the oil is not necessary, it seems that under such conditions the flow of the oil and the fluid stream including steam achieves a stable state which does not interfere with the smooth operation of the process.

We have found that when the foregoing simplified feeding of the heavy oil is performed under conditions such that the flow rate of the fluid in the thermal cracking tube is less than 10 m/sec or the injection of the heavy oil does not satisfy the above-mentioned requirements, the pressure loss disorder is serious or the pressure loss is rapidly increased, and it becomes difficult to stably continue the process.

In order to effect the simplified feeding of heavy oil into the thermal cracking tube, it is advantageous to use a tubular feeding duct having three branches, such as a T-shaped tubular duct, wherein a first opening at the end of one branch receives the heavy oil which is fed thereinto under pressure, and a second opening at the end of a second branch receives a gas (hereinafter referred to as the driving gas) for driving or feeding the heavy oil into the thermal cracking tube. The heavy oil and driving gas are mixed together at the juncture of the two branches and are injected through a third opening located at the end of the third branch into the thermal cracking tube.

The driving gas is used for the following reasons. First, it increases the injection velocity of a highly viscous heavy oil. Second, when the heavy oil is fed to an intermediate location within the thermal cracking tube, that part of the heavy oil feeding duct or pipe which protrudes from the outside through the heating chamber into the thermal cracking tube (the flow passage) is exposed to temperatures of 800° to 1100° C. or higher. Thus, when heavy oil is fed in by itself through the feeding duct, without using the driving gas, and the feeding operation is completely or partially suspended, oil remaining in the feeding duct is apt to undergo thermal cracking and clog the feeding duct. The use of the driving gas enables the oil to be purged from the feeding duct and cools the feeding duct, whereby the above-mentioned clogging of the duct can be prevented. Third, the use of an inert gas, such as nitrogen or steam at a temperature of 300° C. or lower, as the driving gas does not interfere with the thermal cracking or reforming processes.

If desired, in the present invention the heavy oil can also be fed into the thermal cracking tube by means of an atomizer utilizing a driving gas, or an atomizer utilizing the pressure of the heavy oil itself, but the use of such an atomizer is not required in the present invention.

According to the invention, in order to carry out the process in a stable state, it is necessary to feed steam, usually in a superheated state, in an amount such that, within the thermal cracking tube, the ratio of the number of molecules of water in the steam to the number of carbon atoms in the heavy oil, that is, the so-called S/C ratio, is not lower than a certain value in the range of about 3.5 to 5.5, which value depends on the nature of the heavy oil feed and the apparatus that are used. This minimum S/C ratio is hereinafter referred to as the critical S/C ratio.

This high S/C ratio is not needed for reaction purposes because the amount of steam consumed in the thermal cracking tube is at most 0.2 to 0.3 in terms of the S/C ratio. In order to effectively utilize the excess steam in the present invention by partial recycling of the steam, part of the product stream, usually about 30 to 70 vol. %, preferably 35 to 65 vol. % thereof, is separated and is flowed through at least one branch tube which communicates with the thermal cracking tube substantially downstream from the inlet of the thermal cracking tube and/or with a separate downstream tube communicating with a further reactor, such as a catalytic steam reforming reactor. Preferably, the branch extends from the outlet of the thermal cracking tube and/or such downstream process reactor, if any, and recycles the branched-off portion of the product stream back into the thermal cracking tube at at least one location substantially upstream from the corresponding branching point, preferably to the starting point or heavy oil inlet of the thermal cracking tube.

In a modified process, fractional portions of the heavy oil can be fed into the thermal cracking zone from one or more intermediate additional locations different from and spaced from the inlet at the starting point of the flow passage of the thermal cracking tube, preferably 1 to 4 additional locations, particularly 2 to 3 additional locations, on the thermal cracking tube. When fractional portions of the heavy oil are fed to the thermal cracking tube from a plurality of locations along the tube in this fashion, the distance between adjacent heavy oil feed intakes and that between the most downstream heavy oil feed intake and the outlet of the thermal cracking tube are at least long enough so that the heavy oil fed from an upstream feed intake will have been thermally cracked to the desired extent before it reaches the next following downstream feed intake or the outlet of the thermal cracking duct.

When the heavy oil is fed into the thermal cracking tube at 2 or more spaced-apart locations, the residence time refers to the time obtained by dividing (1) the distance between adjacent heavy oil intakes or the distance between the last intake and the outlet of the thermal cracking zone by (2) the flow rate in the thermal cracking tube. When the heavy oil is fed into the thermal cracking zone at only one location, the residence time is total residence time within the thermal cracking tube. When part of the product stream is recycled to the starting point of the thermal cracking tube, the residence time is represented by a value obtained by dividing the distance between the stating point and the terminus of the thermal cracking tube by the flow rate, unless the heavy oil is fed from an intermediate position along the tube.

Although various blowers and pumps can be used to effect the recycling step, it is preferred to use an injector employing, as a driving gas, the steam that is to be fed into the thermal cracking tube in the process of the present invention, because power for the recycling stage can be obtained at the same time as feeding of the steam that is fed into the tube, and the temperature of the recycled stream need not be substantially lowered before use. The steam that is to be fed into the thermal cracking tube is superheated steam at a temperature in the range of 600° to 1100° C., preferably 700° to 950° C. When the recycled stream mixture is mixed with fresh heavy oil by the injector and the mixture is injected into the thermal cracking tube, the temperature of the mixed stream is usually in the range of 650° to 1100° C., preferably 750° to 1000° C.

In the present invention, the thermal cracking tube, defining the thermal cracking zone, is usually connected, in practice, directly or through an appropriate conduit to a subsequent reactor, such as a catalytic steam reforming tube or duct, that is, a reforming zone. It is usually preferred to thermally insulate or heat the conduit connecting the outlet of the thermal cracking tube and the inlet of the catalytic steam reforming duct or tube in an appropriate manner so that the subsequent reforming zone can be smoothly operated.

In constructing a reforming zone as a subsequent reaction stage, said zone is packed with catalyst particles having a particle size of preferably 5 1 to 30 mm, particularly 10 to 20 mm. In order to facilitate the charging and discharging of the catalyst and to reduce the flow resistance, the pipe or tube diameter of the reforming zone is usually larger than that of the cracking zone. The actual pipe diameter of the reforming reactor varies depending on the throughput capacity of the process line and other parameters. Generally, the inner diameter needs to be from 200 to 5000 mm from the viewpoint of the dispersion efficiency of the fluid, unless the diameter exceeds the internal length of the reforming zone.

The enlargement of the inner diameter of the reforming pipe itself, the resulting increase in the thickness of the pipe and the packing of the catalyst in the reforming zone within the pipe unfavorably reduce the heat transfer when the reforming zone must be externally heated. Therefore, it is not easy to sufficiently heat the reforming zone, wherein an endothermic reaction takes place, by external heat supplied through the wall of the pipe, and, moreover, an expensive pipe wall material is required.

When the inlet of a reforming zone is connected to the outlet of the thermal cracking tube in the present invention, it is advantageous to introduce an oxygen-containing gas, such as air, into the reforming zone to partially oxidize the effluent obtained from the cracking zone and thereby to produce heat of combustion, such that the reforming zone is not externally heated, but rather is internally heated and is insulated from external heat. The reforming reactor can be divided into two or more reforming zones and one or more connecting ducts provided with heating means can be interposed, in series, between the separated reforming zones to establish communication therebetween. Preferably, the quantity of heat required for catalytic steam reforming in the reforming zone is compensated for by the method mentioned above. The internal heating method utilizing partial oxidation of the materials being reformed is preferred because of the simplicity of the equipment required and the ease of maintenance.

Any conventional catalysts effective for steam reforming of heavy oil and hydrocarbons can be used in the reforming stage. When heavy oil having a high content of impurities is being used, catalysts which resist poisoning by the impurities should be chosen. The composition, particle size and shape (e.g., spherical, cylindrical, columnar, irregular, polyhedral or formed with projections, and so on) of the catalyst need not necessarily be uniform from the upstream end to the downstream end of the reforming zone, and the optimum catalyst can be chosen according to the relative position of that catalyst in the reforming zone. For example, a catalyst having a shape and a composition which does not allow the deposition of carbon or tar would be used in an upstream section of the reforming zone, even though the gasification efficiency of this catalyst might be somewhat poor, while a catalyst exhibiting a high gasification efficiency is used in a downstream section.

The following examples are provided to illustrate the present invention but are not to be construed as limiting the present invention in any way.

EXAMPLES 1 TO 5

Comparative Examples 1 and 2

A thermal cracking tube having the dimensions set forth in Table 1 was placed in a radiation furnace. As a reforming tube, there was used a refractory brick tube packed with catalysts and covered with a heat insulation layer and an outer steel case (inner diameter: 400 mm, length: 3.5 m). These tubes were connected by a conduit 70 mm in internal diameter, made of a heat-resistant steel, covered with a heat insulation layer and an outer steel case. The following catalysts (I) and (II) were used:

(I) spheres (packing zone length: 1.2 m) 10 mm in diameter) obtained by molding and calcining a mixture of $CaO/Al_2O_3$ (52%/48% weight ratio), and (II) spheres (packing zone length: 2.3 m) 10 mm in diameter obtained by molding and calcining a mixture of $CaO/Al_2O_3/NiO$ (32%/51%/15% weight ratio).

The feedstock employed was an atmospheric distillation residue obtained from a crude oil mixture consisting of approximately equal weights of Arabian light crude oil and Khafji crude oil and a small amount of Iranian heavy crude oil. The feedstock had the following properties:

| specific gravity: | 0.944 |
|---|---|
| carbon/hydrogen weight ratio: | 7.08 (C: 85.0 wt. % H: 12.0 wt. %) |
| kinematic viscosity: | 67.3 cSt (50° C.) |
| high heating value: | 10440 kcal/kg |

The feedstock was preheated to 220° C. before use.

Air was introduced into the reforming tube as a gaseous additive to supply oxygen required for partial oxidation.

The results are shown in Table 1 together with the other conditions employed for each Example and Comparative Example. Gas analysis was conducted by gas chromatography.

TABLE 1

| No. | Ex. 1 | Comp. Ex. 1 | Ex. 2 | Comp. Ex. 2 | Ex. 3 | Ex. 4 | Ex. 5 |
|---|---|---|---|---|---|---|---|

[Constitution of line]

TABLE 1-continued

| No. | Ex. 1 | Comp. Ex. 1 | Ex. 2 | Comp. Ex. 2 | Ex. 3 | Ex. 4 | Ex. 5 |
|---|---|---|---|---|---|---|---|
| Thermal cracking tube | | | | | | | |
| ID (mm) | 30 | 30 | 70 | 115 | 30 | 70 | 70 |
| Thickness (mm) | 8 | 8 | 15 | 21.15 | 8 | 15 | 15 |
| Length (m) | 20 | 7 | 20 | 20 | 20 | 20 | 20 |
| Number | 1 | 1 | 1 | 1 | 3 | 1 | 1 |
| [Thermal cracking zone] | | | | | | | |
| Heavy oil feeder(Note 1) | T | T | T | T | T | T | A |
| Feed amount of heavy oil (Kg/H) | 70 | 70 | 70 | 70 | 70 | 270 | 70 |
| Driving gas | steam | steam | steam | steam | nitrogen | nitrogen | steam |
| Temperature of driving gas, °C. | 200 | 200 | 200 | 200 | 200 | 200 | 200 |
| Flow rate of heavy oil (m/sec) | 80 | 80 | 20 | 20 | 50 | 50 | — |
| Feed amount of steam (Kg/H) | 475 | 475 | 486 | 486 | 475 | 1885 | 490 |
| Temperature of steam °C. | 900 | 900 | 900 | 900 | 900 | 900 | 900 |
| Flow rate (m/sec) | 70 | 70 | 13 | 4.8 | 23 | 49.8 | 13 |
| Residence time (sec) | 0.3 | 0.11 | 1.5 | 4.2 | 1.17 | 0.4 | 1.5 |
| Reaction pressure (atm) | 16 | 16 | 16 | 16 | 16 | 16 | 16 |
| Reaction temperature, °C. | | | | | | | |
| 2m downstream from feeding port of heavy oil | 918 | 920 | 907 | 893 | 915 | 913 | 908 |
| Outlet of thermal | 982 | 940 | 990 | 988 | 990 | 980 | 990 |
| Temperature of outer wall of thermal cracking tube, °C. | | | | | | | |
| 2m downstream from feeding port of heavy oil | 978 | 980 | 980 | 981 | 980 | 980 | 980 |
| Outlet gas (dry) analysis, vol. % | | | | | | | |
| $H_2$ | 64.4 | 71.5 | 59.7 | | 55.6 | 59.6 | 60.2 |
| $CH_4$ | 12.8 | 9.5 | 14.5 | | 13.5 | 13.1 | 13.9 |
| CO | 9.1 | 3.7 | 11.4 | | 10.7 | 9.5 | 11.6 |
| $CO_2$ | 11.6 | 12.9 | 12.5 | | 11.7 | 12.3 | 12.3 |
| $C_2^+$ (Note 2) | 1.3 | 1.5 | 1.1 | | 1.2 | 1.3 | 1.2 |
| $H_2S$ | 0.8 | 0.9 | 0.8 | | 0.7 | 0.8 | 0.8 |
| $N_2$ | — | — | — | | 6.6 | 3.4 | — |
| [Reforming zone] | | | | | | | |
| Feed amount of air ($m^3$/H) | 145 | 145 | 145 | 145 | 145 | 570 | 145 |
| Reaction pressure (Kg/$cm^2$) | 16 | 16 | 16 | 16 | 16 | 16 | 16 |
| Outlet temperature, °C. | 945 | 918 | 956 | | 955 | 973 | 956 |
| Gasification rate, % | 98 | 94 | 99 | | 99 | 99 | 99 |
| Outlet gas (dry) analysis, vol. % | | | | | | | |
| $H_2$ | 45.3 | 43.9 | 45.7 | | 44.5 | 45.0 | 45.6 |
| $CH_4$ | 1.5 | 2.3 | 1.3 | | 1.2 | 0.8 | 1.3 |
| CO | 9.4 | 8.3 | 9.8 | | 9.5 | 9.8 | 9.8 |
| $CO_2$ | 15.6 | 16.2 | 15.4 | | 14.9 | 14.8 | 15.9 |
| $N_2$ (containing Ar) | 27.9 | 29.0 | 27.5 | | 29.6 | 29.3 | 27.1 |
| $H_2S$ | 0.3 | 0.3 | 0.3 | | 0.3 | 0.3 | 0.3 |
| [Operation state] | | | | | | | |
| Stability | good | discontinued due to problems | good | discontinued due to problems | good | good | good |
| Run time (H) | 100 | 12 | 100 | 3 | 100 | 100 | 100 |
| Gasification rate in thermal cracking zone, % | 51 | 35 | 59 | 62 | 63 | 54 | 61 |

Note 1: T refers to a T-shaped nozzle and A to an atomizer nozzle.
Note 2: $C_2^+$ means those gas components having two or more carbon atoms per molecule.

When the result of Example 1 was compared with that of Comparative Example 1, even though the flow rate in both examples was satisfactory, i.e., 70 m/sec, the difference in pressure between the inlet and the outlet parts of the conduit leading to the steam reforming zone progressively increased in Comparative Example 1, and finally the operation had to be discontinued. This is probably because the residence time (0.11 sec) was too short to effect a satisfactory reaction. On the other hand, the residence time in Example 1 was 0.3 sec and a good operation was thereby stably conducted.

When the result of Example 2 was compared with that of Comparative Example 1, the residence time in the latter case was three times as long as that of the former, but the pressure loss became unstable in Comparative Example 2 and the operation had to be discontinued. This is probably because the flow rate was 4.8 m/sec, which is too slow for the purposes of the present invention.

The flow rates and the residence times of Examples 3, 4 and 5 were within the scope of the range as specified in the present invention, and the operations were stably conducted.

EXAMPLES 6 TO 8 AND 12 to 13

These examples show cases wherein part of the product stream from the thermal cracking zone of the present invention was recycled to the inlet (or flow passage starting point) of the thermal cracking tube, or part of the product stream from the steam reforming zone was recycled from the outlet of the catalytic steam reforming tube to the inlet of the thermal cracking tube.

The same heavy oil as used in Examples 1 to 5 was subjected to thermal cracking.

The thermal cracking and steam reforming equipment used constituted a thermal cracking tube having an inner diameter of 70 mm (30 mm in Example 6 and Example 13) and a length of 30 m provided in a radiation furnace, an externally heat-insulated recycling conduit, and an externally heat-insulated catalytic reforming tube having an inner diameter of 400 mm, a length of 3 m, and consisting of a front zone packed with calcined spheres (I) 10 mm in diameter composed of $CaO/Al_2O_3$ in a weight ratio of 52/48 (packing zone length: 1.5 m) and a rear zone packed with calcined spheres (II) 10 mm in diameter composed of $CaO/Al_2O_3/NiO$ in a weight ratio of 32/51/15 (packing zone length: 1.5 m). Heavy oil was fed into the flow passage of the thermal cracking tube at the inlet of the thermal cracking tube by means of an atomizer.

The stream to be recycled at a branching point as indicated in Table 2 below was recycled through the externally heat-insulated recycling conduit to the starting point of the flow passage of the thermal cracking tube. The recycled stream was sucked from the branching point by means of an injector driven by superheated steam, and then reintroduced to the thermal cracking tube.

Starting heavy oil was supplied from the atomizer by utilizing a stream of superheated steam or a mixed stream of superheated steam and the recycled stream injected from the injector. The temperature of the superheated steam was 900° C.

Referring to FIGS. 1A, 1B, 2 and 3, heavy oil was fed through a heavy oil feed pipe 1 by means of an atomizer 3, then passed through a thermal cracking tube 5, which was provided in a zigzag or serpentine shape within a radiation furnace 4, and was then introduced through a conduit 6 into a catalytic steam reformer 7. The products were discharged through a conduit 9 and a heat exchanger 10. Superheated steam was fed to the atomizer 3 through a pipe 2 and was mixed therein with the heavy oil, such that fine heavy oil droplets became dispersed in the steam when the mixture was injected into the thermal cracking tube 5.

Figure 2:
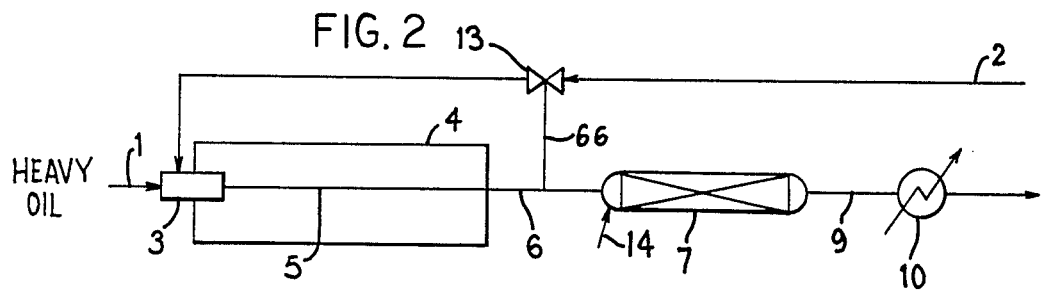
Figure 3:
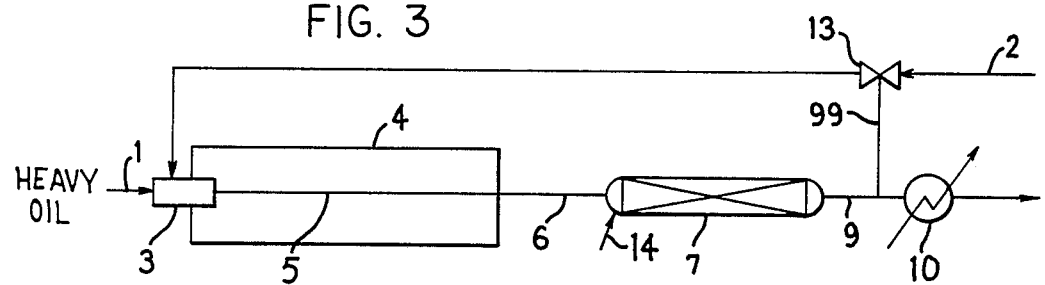
Figure 1B:
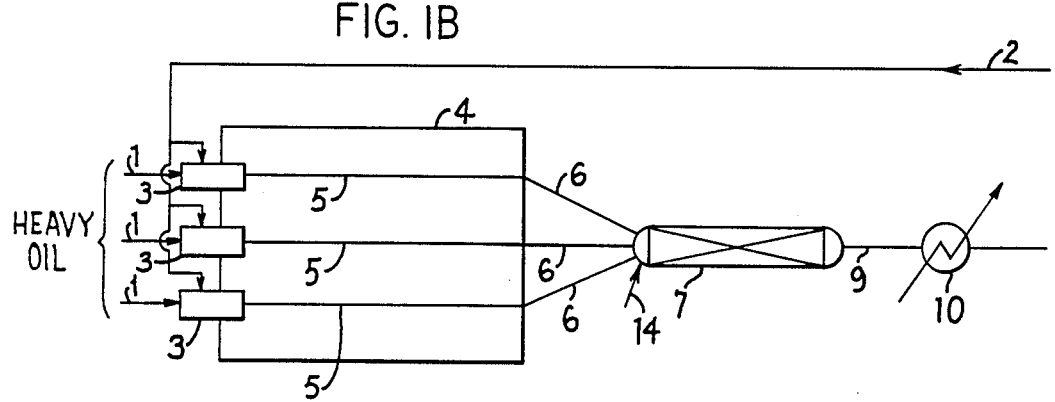

In FIG. 1A, the atomizer 3 was directly operated by superheated steam from pipe 2 for injecting heavy oil into the thermal cracking tube 5. FIG. 1B shows a similar arrangement, except that a plurality of thermal cracking tubes 5 are provided in parallel and feed to a common reformer 7. In FIG. 2, the injector 13 was operated by superheated steam fed through from pipe 2 and which was effective to suck a branched stream from the conduit 6 into a branch pipe 66. After the superheated steam was mixed with the branched stream in the injector 13 and pipe 2 to form a mixed stream, the atomizer 3 was operated by the mixed stream to inject heavy oil into the thermal cracking tube 5. In FIG. 3, the injector 13 was operated by superheated steam from pipe 2 to suck a branched stream from the conduit 9 into a branch pipe 99. After the superheated steam was mixed with the branched stream in the injector 13, the atomizer 3 was operated by the mixed stream to inject heavy oil into the thermal cracking tube 5.

A small amount of air was supplied from a supply line 14 to the reformer 7 in each case to compensate for the quantity of heat consumed for the reforming by means of heat produced by internal combustion of hydrocarbons contained in the reaction stream with the oxygen in the air. The thermal cracking of heavy oil in Examples 6–8 and 12–13 was conducted by employing the processes as shown in FIGS. 1A, 2 and 3, as indicated in Table 2. The results and reaction conditions for these examples are given in Table 2.

In Table 2, the recycle ratio is the proportion of (1) the amount of the branched stream recycled through the branch pipe 99 or 66 to (2) the total amount of the effluent from the thermal cracking tube flowing through the conduit 9 or 6, respectively. The gas composition is one obtained on a dry gas basis by gas chromatography.

The flow rate (velocity) is calculated from the cross-sectional area of the thermal cracking tube used in these examples at the re-entry point of the recycled stream, the thermal cracking temperature and the pressure, generally by values determined at the outlet of the thermal cracking tube, based on the sum of the flow amount of steam fed and that of the recycled stream. The residence time can be calculated from the flow rate and the length of the tube, taking the cross-sectional area of the tube into consideration if necessary.

The gas compositions given in Table 2 refer to component amounts obtained by sampling the effluent from each outlet and analyzing it. The samplings were conducted two hours after the start of the operation and then four times at intervals of 24 hours. Each value given in Table 2 is the average of these five operations.

When the recycling procedure is carried out by branching off part of the fluid stream from the outlet of the thermal cracking tube and/or the outlet of the reformer to the starting point of the thermal cracking tube at a total recycling ratio of from about 0.35 to 0.65 and at the critical S/C ratio value of about 5.5, as exemplified in the above examples, the total amount of fresh steam used in the process can be reduced to from 73 to 36% of the amount used when no recycling of steam is conducted. Recycling of the steam in this way thus allows industrially valuable reduction of the total amount of freshly supplied steam used, and also enables a flow mixture of a sufficient S/C ratio of not less than 2 for a subsequent catalytic steam reforming process. Also, remarkable economic savings on energy, water and steam-generating equipment can be obtained.

Examples 12 and 13 are examples of processes conducted without recycling a portion of the stream according to FIG. 1A. It has been ascertained by other experiments that the critical S/C ratio in such thermal cracking reactions is about 5.5 and that, when this ratio is lowered to 4.5, for example, the system cannot be stably operated for a long time due to the instability of the flow and excessive increase of the pressure loss in the thermal cracking tube.

TABLE 2

| | Example | | | | |
|---|---|---|---|---|---|
| | 6 | 7 | 8 | 12 | 13 |
| Feed amount of heavy oil (Kg/H) | 70 | 70 | 40 | 70 | 40 |
| Feed amount of superheated steam (Kg/H) | 370 | 315 | 175 | 490 | 280 |
| S/C ratio* | 4.1 | 3.5 | 3.4 | 5.5 | 5.5 |
| Thermal cracking tube | | | | | |
| Outlet pressure (Kg/cm²G) | 15.2 | 15.0 | 13.3 | 14.9 | 15.0 |
| Outlet temperature (°C.) | 982 | 1003 | 925 | 898 | 905 |
| Flow rate (m/sec) | 12 | 12 | 36 | 12 | 36 |
| Residence time (sec) | 2.5 | 2.5 | 0.83 | 2.5 | 0.83 |
| Branching point (conduit number in FIGS. 2 and 3) | 9 | 9 | 6 | — | — |
| Recycle ratio | 0.32 | 0.55 | 0.40 | | |
| Gas composition (vol. %) | | | | | |
| Outlet of thermal cracker | | | | | |
| $H_2$ | 50.7 | 47.8 | 47.0 | 52.0 | 47.4 |
| $CH_4$ | 19.6 | 20.1 | 29.7 | 21.9 | 22.6 |
| CO | 12.5 | 12.3 | 14.1 | 15.3 | 17.8 |
| $CO_2$ | 11.4 | 10.9 | 5.4 | 10.4 | 5.1 |
| $C_2H_4$ | 0.1 | — | 3.0 | — | 5.3 |
| $C_2H_6$ | — | — | 0.5 | — | 0.3 |
| $N_2$ | 5.1 | 8.4 | — | — | 1.2 |
| $H_2S$ | 0.6 | 0.5 | 0.3 | 0.4 | 0.3 |
| Outlet of reformer | | | | | |
| $H_2$ | 45.0 | 48.7 | 43.9 | 47.2 | 46.8 |
| $CH_4$ | 0.4 | 2.4 | 2.5 | 2.5 | 4.8 |
| CO | 8.8 | 9.0 | 7.9 | 9.6 | 7.9 |
| $CO_2$ | 15.8 | 16.3 | 16.8 | 17.8 | 18.8 |
| $N_2$ | 29.4 | 23.6 | 28.3 | 22.5 | 21.5 |
| $H_2S$ | 0.6 | 0.5 | 0.6 | 0.4 | 0.4 |
| Run time (H) | 100 | 100 | 100 | 100 | 100 |

Note:
*The ratio of the number (S) of water steam molecules in the number (C) of carbon atoms from the heavy oil.

Figure 6:
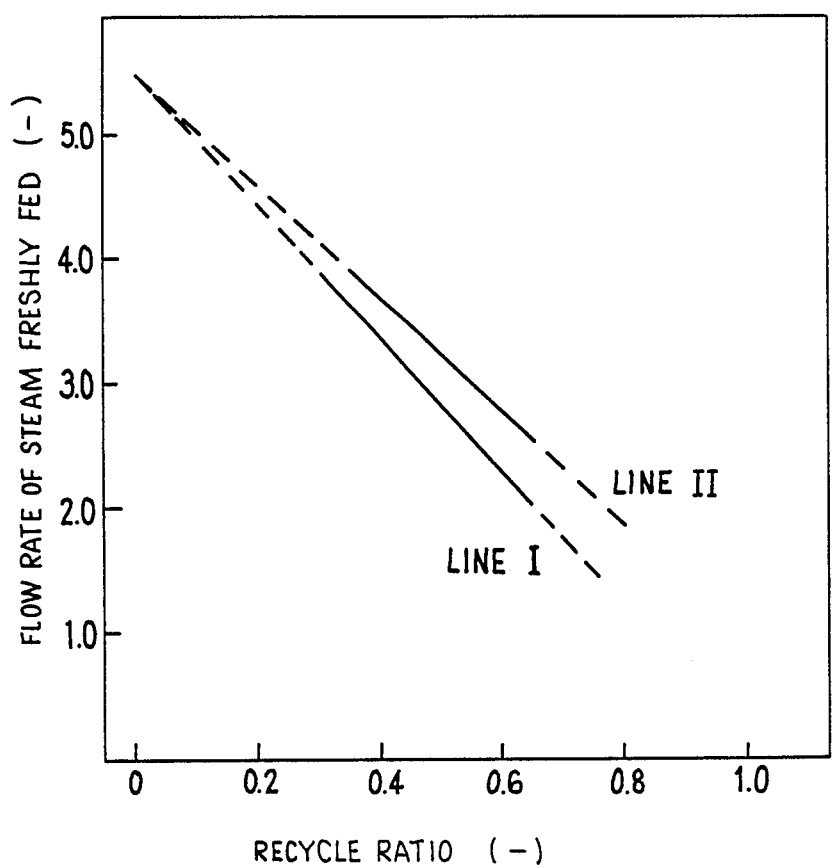
FIGS. 6 to 8 are graphs showing the relationship between the recycle ratio, on the one hand, and the flow rate of freshly fed steam, the gas from the reformer outlet, and the gas from the thermal cracker outlet, respectively, in accordance with two embodiments of the present invention.
Figure 7:
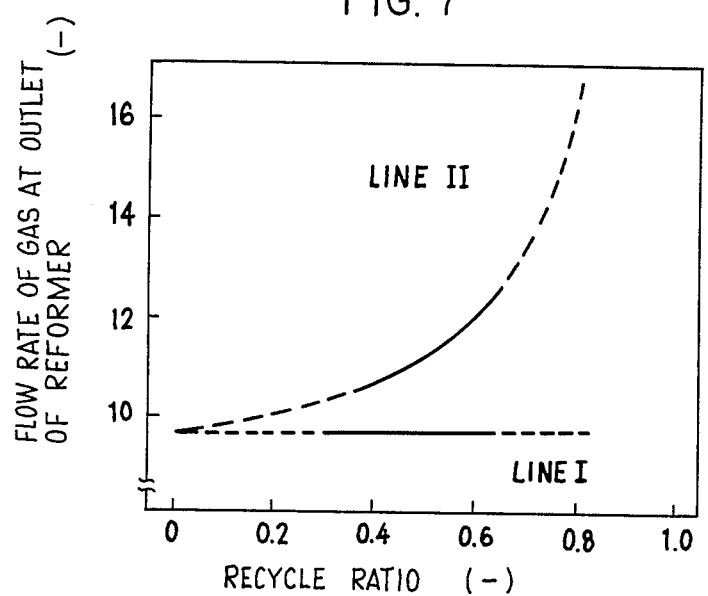
Figure 8:
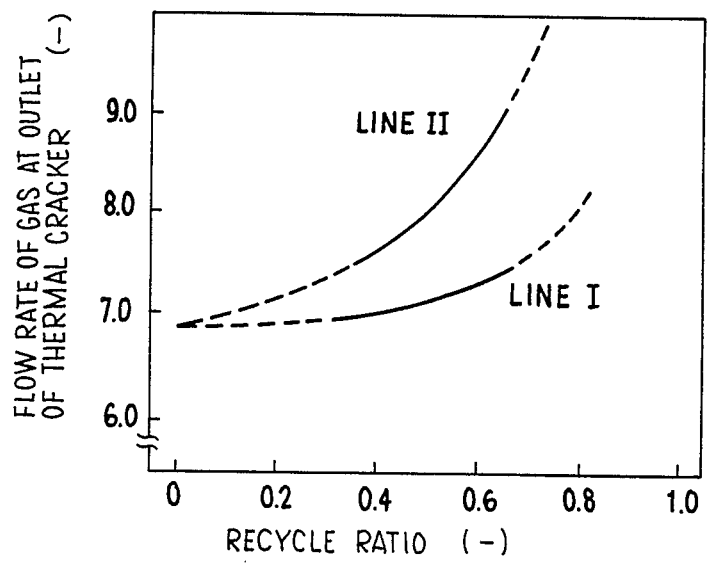

FIGS. 6 to 8 show the relationship between the recycle ratio and the flow rate of steam or fluid in accordance with the present invention when the S/C ratio is 5.5 at the inlet of the thermal cracking tube, taking the recycled steam into account but neglecting steam consumed in the thermal cracking tube (several percent at most). In each of FIGS. 6–8, Line I represents the recycling process as shown in FIG. 2, and line II represents the recycling process as shown in FIG. 3. The recycle ratio is the ratio of the amount of branched off fluid to the total amount of fluid flowing from the outlet of the thermal cracking tube or the outlet of the catalytic reformer just before the branching takes place. The flow rate of the steam or gas has been made dimensionless in FIGS. 6–8 by dividing it by the flow rate of the steam at an S/C ratio value of 1.0.

FIG. 6 is a graph showing a typical relationship between the recycle ratio of the stream and the flow rate of fresh steam to be fed via the line 2 when the ratio of the flow rate of the total steam, including steam in the recycled stream, to the flow rate of raw heavy oil at the inlet of the cracker, is 5.5 in terms of the S/C ratio. The amount of steam consumed in the thermal cracking tube was ignored because said amount of steam is at most about 6%. The flow rate of the fresh steam to be fed at the inlet of the thermal cracking tube is determined by the S/C ratio.

FIG. 7 is a graph showing a typical relationship between the recycle ratio and the flow rate of the product stream at the outlet of the reformer when the S/C ratio at the inlet of the thermal cracker is 5.5, including steam in the recycled stream. FIG. 8 is a graph showing the typical relationship between the recycle ratio and the flow rate of the product stream at the outlet of the thermal cracker under the same conditions. The flow rate of fresh steam to be fed into the thermal cracker, the flow rate of the stream at the outlet of the thermal cracker and the flow rate of the stream at the outlet of the reformer were all made dimensionless by dividing each rate by the flow rate of steam through the line 2 in FIGS. 2 and 3 which affords an S/C ratio of 1.

Usually, a recycle ratio of 0.3 or more is suitable when the recycling is effected from the outlet of the thermal cracker. This is because when the recycle ratio of the line I of FIG. 6 is less than 0.3, the flow rate of fresh steam to be fed must be set at more than 4.0 in terms of the S/C ratio, which is industrially uneconomical. When the recycle ratio exceeds about 0.65, the flow rate of fresh steam in terms of the S/C ratio in the thermal cracker becomes 2.0 or less. Thus, when it is intended to conduct catalytic steam reforming together with thermal cracking as in the above-mentioned examples to obtain hydrogen and carbon monoxide as main products, the S/C ratio in the reformer also becomes 2.0 or less. However, it is desirable that the S/C ratio in the reformer be 2.0 or more, and hence the recycle ratio should be 0.65 or less. Since the flow rate of gas including the recycled stream at the outlet of the thermal cracker is scarcely changed when the recycle ratio varies within the range of 0.3 to 0.65, as shown by the line I of FIG. 8, the size of the equipment has no effect on the recycling step.

When the recycling step is carried out from the outlet of the reformer, a recycle ratio of from 0.35 to 0.65 is suitable as shown by FIGS. 6 to 8. When the recycle ratio is less than 0.35, the S/C ratio becomes 4 or more as shown by the line II of FIG. 6, and hence the process is not economical. When the recycle ratio exceeds 0.65, the flow rates of gas at the outlets of the thermal cracker and reformer are rapidly increased as shown by the lines II in FIGS. 7 and 8 and hence the process is also not economical.

When the recycling is carried out from the outlet of the thermal cracking tube and/or the outlet of the reformer to the starting point of the thermal cracking tube at a total recycle ratio in the range of 0.35 to 0.65 as shown in the above Examples 6 to 8 under conditions such that the critical S/C ratio is 5.5, as in the above Examples 12 and 13, wherein no recycling was conducted, the amount of fresh steam to be fed into the thermal cracker can be reduced by 73 to 36% of the amount in a case wherein recycling is not conducted. Hence, the consumption of superheated steam can be reduced and remarkable economic savings of energy, water and steam-generating equipment can be obtained.

EXAMPLE 9

A feeder as shown in part in FIG. 4 was provided at the inlet at the upstream end of a serpentine thermal cracking tube which had an inner diameter of 70 mm, a length of 30 m, and was bent in about three zigzag turns and was located within a radiation furnace having a temperature of about 1100° C. To the outlet of the foregoing thermal cracker was connected an externally heat-insulated catalytic reformer having an inner diameter of 400 mm and a length of 3.0 m by an externally heat-insulated conduit. The front zone of the reformer was packed with calcined spheres 10 mm in diameter composed of $CaO/Al_2O_3$ in a weight ratio of 52/48, with a packing zone length of 1.5 m. The rear zone thereof was packed with calcined spheres 10 mm in diameter composed of $CaO/Al_2O_3/NiO$ in a weight ratio of 32/51/15, with a packing zone length of 1.5 m.

In order to compensate for the heat of reaction in the reformer by partial combustion of the mixture after thermal cracking, the reformer was provided with an inlet for a gaseous additive at the upstream zone thereof, around the inlet for the thermally cracked products, and a small amount of air was fed therethrough. By using this equipment, thermal cracking and reforming were sequentially conducted. The results and the other reaction conditions are given in Table 3.

Piping and equipment provided between the feeding tubes or ducts for heavy oil, steam and driving gas and the outlet of the reformer were externally insulated as needed.

EXAMPLE 10

At the upstream end of a thermal cracking tube which had an inner diameter of 30 mm and a length of 20 m and was bent in about two zigzag turns and was located within a radiation furnace having a temperature of about 1100° C., there was provided a feeder as shown in FIG. 5. The main steam stream flowed from the upper left part of a cracking tube 666 to the lower part thereof. A reformer and connecting mechanism similar to those used in Example 9 were used. The results and the other reaction conditions are shown in Table 3.

FIG. 4 shows an example wherein a feeder employing a T-shaped pipe is provided at the upstream end of a cracking tube 666. Coaxial ducts 111, 112 and branched duct 222 are defined by a block 777 which has a cavity therein defining an intersection 333 allowing communication between ducts 111, 112, 222. Three pipes are screwed into the ends of the three openings in the block 777 defined by the ducts 111, 112, 222. The duct 112 is narrowed in the neighborhood of an injection port 444 defined by the lower end of the associated pipe, whereby the injection flow rate is increased. The heavy oil is supplied through the duct 222 and is driven down by a driving gas supplied through the upper end of duct 111, and the mixture of heavy oil and driving gas is ejected from the port 444. The main steam stream for the reaction is supplied through a main stream inlet duct 555 to the upstream end of the thermal cracking tube 666. Heavy oil and the driving gas therefor are injected from the injecting port 444, in the same direction as the direction of the flow of the main steam stream, toward the center of the tube 666 to subject the heavy oil to thermal cracking. The duct 555 is constructed of a T-shaped pipe having a laterally extending steam inlet branch. The T-shaped pipe extends to the side of the injection port 444 with respect to the block 777, which pipe defines the portion of the duct 555 which concentrically surrounds the duct 111, and is screwed into the block 777.

FIG. 5 is an example of a feeding apparatus suitable for use in a case where heavy oil is fed into the thermal cracking tube at an intermediate location between the upstream and the downstream ends of the thermal cracking tube and downstream from the main steam inlet duct (not shown). The feeding apparatus is similar to the one shown in FIG. 4, except that the inlet duct 555 is not used. Near a location where the lengthwise axis of the zigzag or serpentine thermal cracking tube 666 extending from its upstream end toward its downstream end changes from a curve to a straight line, as shown in FIG. 5, heavy oil and a driving gas are fed through the duct 111 on the side of the injection port 444, the duct 111 having a linear axis substantially coaxial with the axis of the adjacent portion of the thermal cracking tube 666. The heavy oil and gas are injected in the direction of the flow of the fluid in the thermal cracking tube 666. In FIG. 5, the block and associated pipes which are shown in FIG. 4 are omitted for brevity. This feeding mechanism is more advantageous when available space is narrower than the space needed for larger conventional atomizers.

EXAMPLES 14 AND 15

A thermal cracker and reformer, the same as the ones used in Examples 9 and 10, were used, and the experiments of Examples 9 and 10 were repeated with the exception that an atomizer utilizing the main steam for the atomization of the heavy oil was used in place of the feeder shown in FIG. 4, which was employed in Examples 9 and 10. The results and test conditions are given in Table 3. In contrast with the foregoing Examples 9 and 10, it was necessary to previously adjust the atomized state of the heavy oil and operations such as the fitting of the feeder were complicated because the size of the feeding mechanism was large.

EXAMPLE 11

Comparative Example 3

The same experiments as conducted in Examples 9 and 10 were repeated, except that conditions relating to the heavy oil injection rate were as given in Table 3. The results are shown in Table 3.

Heavy oil used in all of the foregoing experiments was the same as that used in Examples 1 to 5 and was preheated at a temperature listed in Table 3 before use.

The analysis of product gas compositions was conducted by gas chromatography after drying the gases.

TABLE 3

| Items | Example | | | | | Comparitive Example |
|---|---|---|---|---|---|---|
| | 9 | 10 | 11 | 14 | 15 | 3 |
| Type of heavy oil feeder | FIG. 4 | FIG. 5 | FIG. 4 | Atomizer | Atomizer | FIG. 5 |
| Heavy oil feed rate (Kg/H) | 55 | 40 | 55 | 55 | 40 | 40 |
| Heavy oil preheating temperature (°C.) | 280 | 250 | 275 | 280 | 250 | 255 |
| Heavy oil spouting rate (m/sec) | 15 | 60 | 3 | — | — | 20 |
| Heavy oil pressure (Kg/cm$^2$) | 18.0 | 17.8 | 17.0 | 18.0 | 17.8 | 16.6 |
| Driving gas | steam | nitrogen | steam | — | — | nitrogen |
| Driving gas temperature (°C.) | 220 | 220 | 220 | — | — | 220 |
| Main steam temperature (°C.) | 900 | 900 | 900 | 900 | 900 | 900 |
| Main steam pressure (Kg/cm$^2$) | 25 | 25 | 25 | 25 | 25 | 25 |

TABLE 3-continued

| Items<br>Type of heavy oil feeder | Example 9<br>FIG. 4 | Example 10<br>FIG. 5 | Example 11<br>FIG. 4 | Example 14<br>Atomizer | Example 15<br>Atomizer | Comparitive Example 3<br>FIG. 5 |
|---|---|---|---|---|---|---|
| Main. steam feed rate (Kg/H) | 390 | 280 | 390 | 390 | 280 | 280 |
| Flow rate in cracking duct (m/sec) | 12 | 48 | 12 | 12 | 48 | 48 |
| Pressure at outlet of thermal cracking duct (Kg/cm²G) | 15 | 15 | 15 | 15 | 15 | 15 |
| Gas composition after thermal cracking (vol. %) | | | | | | |
| $H_2$ | 61.8 | 52.9 | 60.5 | 61.2 | 60.5 | 57.8 |
| $CH_4$ | 12.1 | 11.4 | 13.3 | 13.3 | 13.0 | 12.6 |
| CO | 8.7 | 8.3 | 9.6 | 8.8 | 9.5 | 9.0 |
| $CO_2$ | 11.5 | 10.7 | 10.3 | 10.9 | 12.1 | 11.6 |
| $C_2H_4$ | 4.0 | 2.6 | 4.1 | 3.9 | 3.0 | 2.8 |
| $C_2H_6$ | 1.0 | 0.9 | 1.2 | 1.0 | 1.0 | 0.9 |
| $N_2$ | 0.1 | 12.6 | 0.1 | 0.1 | 0.1 | 4.6 |
| $H_2S$ | 0.8 | 0.7 | 0.8 | 0.8 | 0.8 | 0.7 |
| Gas composition after reforming (vol %) | | | | | | |
| $H_2$ | 38.2 | 39.9 | 39.0 | 38.0 | 39.8 | 39.8 |
| $CH_4$ | 0.7 | 1.3 | 0.8 | 0.8 | 1.3 | 1.3 |
| CO | 7.6 | 3.8 | 7.9 | 7.7 | 4.2 | 4.2 |
| $CO_2$ | 16.3 | 18.8 | 16.2 | 16.5 | 19.4 | 17.6 |
| $N_2$ | 37.2 | 35.8 | 35.6 | 36.5 | 34.8 | 36.6 |
| $H_2S$ | 0.5 | 0.4 | 0.5 | 0.5 | 0.5 | 0.5 |
| Run time (H) | 100 | 100 | 100 | 100 | 100 | 7* |

*Variations in pressure loss were large and the operation was discontinued.

The embodiments of the invention in which an exclusive property or privilege is claimed are defined as follows:

1. A process for the thermal cracking of heavy oil containing nonvaporizable, high molecular weight hydrocarbons, in the presence of steam, to produce a product fluid, which process utilizes a three-branch, forked, tubular duct comprising first, second and third duct branches, which comprises the steps of:

passing said heavy oil through said first duct branch, passing an entrainment gas through said second duct branch, mixing said heavy oil with said entrainment gas at the juncture of said first and second duct branches and then, without atomizing said heavy oil, injecting the mixture of said heavy oil and said entrainment gas through said third branch in one longitudinal direction, at an injection velocity, into an inlet of an elongated tubular thermal cracking zone which is free of solids; and, in said thermal cracking zone, passing a fluid comprising a mixture of said heavy oil, said entrainment gas and steam in said one longitudinal direction through said thermal cracking zone, at a flow velocity which is less than or equal to said injection velocity and is in the range of 10 to 100 m/sec, said thermal cracking zone being at a temperature in the range of 800° to 1100° C. and at a pressure in the range of 0 to 50 kg/cm²G, said fluid being maintained within said thermal cracking zone for a residence time of at least 0.2 sec, effective to thermally crack said heavy oil without depositing carbon in said thermal cracking zone.

2. A process for the thermal cracking of heavy oil containing nonvaporizable, high molecular weight hydrocarbons, in the presence of steam, to produce a product fluid, which process utilizes a three-branch, forked tubular conduit comprising first, second and third duct branches, which comprises the steps of:

passing said heavy oil through said first duct branch, passing an entrainment gas through said second duct branch, mixing said heavy oil with said entrainment gas at the juncture of said first and second duct branches and then, without atomizing said heavy oil, injecting the mixture of said heavy oil and said entrainment gas through said third branch in one longitudinal direction, into an inlet at the center of the cross-section of an elongated tubular thermal cracking zone which is free of solids; and, in said thermal cracking zone, passing a fluid comprising a mixture of said heavy oil, said entrainment gas and steam in said one longitudinal direction through said thermal cracking zone, at a flow velocity in the range of 10 to 100 m/sec, said thermal cracking zone being at a temperature in the range of 800° to 1100° C. and at a pressure in the range of 0 to 50 kg/cm²G, said fluid being maintained within said thermal cracking zone for a residence time of at least 0.2 sec, effective to thermally crack said heavy oil without depositing carbon in said thermal cracking zone.

3. A process according to claim 1 or claim 2 in which said thermal cracking zone comprises a plurality of thermal cracking tubes arranged in parallel.

4. A process according to claim 1 or claim 2 further comprising recycling a portion of the product fluid containing a portion of said steam by removing said portion of said product fluid from said thermal cracking zone or outlet thereof substantially downstream from the inlet at which said heavy oil and steam enter said thermal cracking zone, and recycling said portion of said product fluid to said thermal cracking zone substantially upstream from the location at which said portion was removed.

5. A process according to claim 1 or claim 2, wherein said temperature is in the range of from 850° to 1050° C., said pressure is in the range of from 5 to 40 kg/cm²G, said flow velocity is in the range of from 25 to 90 m/sec, and said residence time is at least 0.4 seconds.

6. A process according to claim 1 or claim 2, wherein said temperature is in the range of from 900° to 1025° C., said pressure is in the range of from 10 to 40 kg/cm²G, said flow velocity is in the range of from 50 to 90 m/sec, and said residence time is in the range of 0.4 to 2.0 seconds.

7. A process as claimed in claim 1 or claim 2, wherein said thermal cracking zone is at least one hollow unfilled tube and said tube has an inner diameter in the range of 25 to 250 mm.

8. A process according to claim 1 or claim 2, wherein said thermal cracking zone is at least one hollow unfilled tube and said tube has an inner diameter in the range of from 50 to 150 mm.

9. A process as claimed in claim 1 or claim 2, wherein said entrainment gas is nitrogen or steam heated to a temperature of 300° C. or less.

10. A process according to claim 4, wherein said recycled portion of said product fluid is in the range of 30 to 70% by volume of said product fluid.

11. A process according to claim 1 or claim 2, further comprising the steps of introducing said product fluid from said thermal cracking zone into a catalytic steam reforming zone packed with a steam reforming catalyst under conditions effective to catalytically reform hydrocarbons in said product fluid to produce a reformed product comprising synthesis gas.

12. A process according to claim 11, further comprising the step of introducing a gas comprising oxygen into said catalytic reforming zone.

13. A process according to claim 4, further comprising the steps of introducing said steam through a suction injector installed on a steam feed line between a steam source and said inlet for said steam before said steam reaches said inlet for said steam, thereby creating suction in a branch line in communication with said suction injector and said steam feed line; and drawing 30 to 70% of said product fluid which flows from an outlet of said thermal cracking zone into said branch line by means of said suction injector, thereby recycling said portion of said product fluid with said steam to said inlet for said steam.

14. A process according to claim 1 or claim 2, wherein the ratio of the total number of water molecules in said steam to the number of carbon atoms derived from said heavy oil at the inlet of said thermal cracking zone is a critical value in the range of from 3.5 to 5.5.

15. A process according to claim 1 or claim 2 in which at least one fractional portion of said heavy oil is fed into said thermal cracking zone from at least one additional location different from and parallel to said third duct branch.

16. A process according to claim 11 further comprising recycling a portion of said reformed product containing part of said steam by removing said portion of said reformed product from said steam reforming zone or outlet thereof, and recycling said portion of said reformed product to said thermal cracking zone.

17. A process according to claim 16 wherein said recycled portion of said reformed product is in the range of 30 to 70% by volume of said reformed product.

18. A process according to claim 16 further comprising the steps of introducing said steam through a suction injector installed on a steam feed line between a steam source and an inlet for said steam before said steam reaches said inlet for said steam, thereby creating suction in a branch line in communication with said suction injector and said steam feed line; and drawing 30 to 70% of said reformed product which flows from an outlet of said steam reforming zone into said branch line by means of said suction injector, thereby recycling said portion of said reformed product with said steam to said inlet for said steam.

19. A continuous process for the thermal cracking of heavy oil which contains nonvaporizable, high molecular weight hydrocarbons, to produce a product fluid, which process utilizes a three-branch, forked tubular duct comprising first, second and third branches, which consists essentially of the steps of:

passing a stream of said heavy oil through said first duct branch, passing a stream of an entrainment gas through said second duct branch and mixing said entrainment gas with said heavy oil at the juncture of said first and second duct branches so as to entrain the oil in said gas to form a first mixture of said entrainment gas and oil, said entrainment gas being selected from the group consisting of nitrogen and steam having a temperature not higher than 300° C., passing said first mixture through said third branch without atomizing said oil and thence through an injection port directly into the inlet end of an externally heated, hollow, unfilled, elongated, thermal cracking zone so that said first mixture enters said thermal cracking zone and flows in a first longitudinal direction from said inlet toward the outlet end of said thermal cracking zone at a first injection velocity, simultaneously passing a stream containing superheated steam having a temperature of from 600° to 1100° C. into said inlet end of said thermal cracking zone to mix said stream with said first mixture whereby to form a second mixture that undergoes thermal cracking in said thermal cracking zone, the amount of superheated steam and oil in said second mixture being such that the steam/carbon ratio of said superheated steam and said oil is at least 3.5, passing said second mixture in said first longitudinal direction through said thermal cracking zone at a second flow velocity which is equal to or lower than said first velocity and is in the range of from 10 to 100 m/sec, said thermal cracking zone having a temperature of from 800° to 1100° C. and a pressure of from 0 to 50 kg/cm$^2$ gauge and maintaining said second mixture in said thermal cracking zone for at least 0.2 sec effective to thermally crack said oil in the absence of a catalyst.

20. A continuous process for the thermal cracking of heavy oil which contains nonvaporizable, high molecular weight hydrocarbons, to produce a product fluid, which process utilizes a three-branch, forked tubular duct comprising first, second and third branches, which consists essentially of the steps of:

passing a stream of said heavy oil through said first duct branch, passing a stream of an entrainment gas through said second duct branch and mixing said entrainment gas with said heavy oil at the juncture of said first and second duct branches so as to entrain the oil in said gas to form a first mixture of said entrainment gas and oil, said entrainment gas being selected from the group consisting of nitrogen and steam having a temperature not higher than 300° C., passing said first mixture through said third branch without atomizing said oil and thence through an injection port directly into the inlet end of an externally heated, hollow, unfilled, elongated, thermal cracking zone at the central portion of a cross-section thereof so that said first mixture enters said thermal cracking zone and flows in a first longitudinal direction from said inlet toward the outlet end of said thermal cracking zone, simultaneously passing a stream containing superheated steam having a temperature of from 600° to 1100° C. into said inlet end of said thermal cracking zone to mix said stream with said first mixture whereby to form a second mixture that undergoes thermal cracking in said thermal cracking zone, the amount of superheated steam and oil in said second mixture being such that the steam/carbon ratio of said superheated steam and said oil is at least 3.5, passing said second mixture in said first longitudinal direction through said thermal cracking zone at a flow velocity which is in the range of from 10 to 100 m/sec, said thermal cracking zone having a temperature of from 800° to 1100° C. and a pressure of from 0 to 50 kg/cm$^2$ gauge and maintaining said second mixture in said thermal cracking zone for at least 0.2 sec effective to thermally crack said oil in the absence of a catalyst.

\* \* \* \* \*